United States Patent [19]

Erlichman

[11] 4,161,749

[45] Jul. 17, 1979

[54] PRINTER FOR PRODUCING PRINT OF AN ELECTRONICALLY RECORDED IMAGE

[75] Inventor: Irving Erlichman, Wayland, Mass.

[73] Assignee: Polaroid Corporation, Cambridge, Mass.

[21] Appl. No.: 891,704

[22] Filed: Mar. 30, 1978

[51] Int. Cl.[2] ........................ H04N 1/46; H04N 1/46; G01D 9/28

[52] U.S. Cl. ........................................ 358/75; 358/78; 346/46

[58] Field of Search .................................... 358/75–80; 346/46, 105, 106

[56] References Cited

U.S. PATENT DOCUMENTS

| | | | |
|---|---|---|---|
| 3,149,900 | 9/1964 | Horne et al. | 346/46 R |
| 3,230,303 | 1/1966 | Macovski et al. | 358/77 |
| 3,623,124 | 11/1971 | Platz | 346/46 X |
| 3,730,975 | 5/1975 | Kono et al. | 358/75 |
| 3,780,214 | 12/1973 | Bestenreiner et al. | 358/75 |
| 3,995,279 | 11/1976 | Wiesmuller et al. | 346/75 |
| 4,067,017 | 1/1978 | Dertouzos et al. | 346/46 |

OTHER PUBLICATIONS

"Plotter Generates Compunter Output in Color"; *Design News*, Sep. 5, 1977, pp. 36–37.

*Primary Examiner*—Howard W. Britton
*Assistant Examiner*—Aristotelis M. Psitos
*Attorney, Agent, or Firm*—John S. Vale

[57] ABSTRACT

A compact printer for use with electronic image recording apparatus for providing a color print of an electrically recorded image by effecting the selective transfer of colored printing mediums from a transfer sheet to an image-receiving sheet in accordance with electronic image signals that define different color components of the image.

11 Claims, 11 Drawing Figures

PRINTER FOR PRODUCING PRINT OF AN ELECTRONICALLY RECORDED IMAGE

BACKGROUND OF THE INVENTION

1. Field of the Invention

The present invention relates to the field of printers that are responsive to electronic information signals for providing a hard copy print of electronically recorded information and, more particularly, to a printer for providing a color print of an electronically recorded image on an image-receiving sheet.

2. Description of the Prior Art

The present invention provides a compact and simply constructed printer for providing a hard copy color print of an electronically recorded image of a scene and is especially well suited for incorporation into a hand-held, self-processing, electronic imaging camera of the type disclosed in my commonly assigned copending application Ser. No. 891,705 filed on Mar. 30, 1978.

The printer embodying the present invention is of the scanning type in which an image receiving sheet is rotated on a drum while a print head mounting a plurality of printing transducers is advanced along the length of the drum to convert electronic image signals, representing different color components of a recorded image, into printing signals which are effective to cause the selective transfer of corresponding colored printing mediums from a transfer sheet to the image receiving sheet during a single scan thereby printing out a plurality of overlying dot-like patterns that define the image in much the same manner as a color half-tone lithographic printing process.

The printer also includes a mechanism that is actuable to automatically advance an image-receiving sheet from a cassette into operative relation with the drum and to advance or index an elongated transfer sheet to present a fresh set of colored printing medium stripes thereon for each successive print into operative alignment with the printing transducers. This feature substantially reduces the amount of manual manipulation of the printing materials required of the operator in making such a print.

Printers responsive to electronic image signals for making hard copy prints are known in the art but in general are not well suited for use in such a hand-held electronic imaging camera or other similar electronic image recording apparatus because of their large physical size, structural complexity or requiring multiple color application stations or multiple pass scans to provide a color print.

For example, the Sept. 5, 1977 issue of "Design News" at pages 36 and 37 describes a scanning type drum printer which prints out a color image of an electronically recorded image by selectively spraying droplets of red, yellow and blue ink onto an image-receiving sheet with image signal modulated jet spray nozzles. However, this device is quite large and complex and the need to store liquid inks and provide pressure pumps as well as the electronic modulating devices makes such an ink jet printer impractical for incorporation into a hand-held camera. Also, this printer does not include provisions for automatically advancing image-receiving sheets into operative relation with the drum.

U.S. Pat. No. 3,230,303 issued to A. Macovski et al on Jan. 18, 1966 is relevant for showing an electrostatic scanning type printer for making a multicolor print of an image in accordance with yellow, magenta, cyan and black image signals derived from photoelectrically scanning a multicolor original. The printer includes a drum 16 on which a dielectric paper 17 is supported for rotation while being scanned by an electrostatic stylus 34 that is modulated by one of the four image signals to form a first electrostatic image on paper 17. The first image is developed by dispensing a corresponding colored toner power from one of four boxes 70, 72, 74 and 76 and the first image is fixed at powder fixer station 78. The scanning, development and fixing process is then repeated in sequence for the remaining three image signals to form the color print. The extended time for making the print because of the multiple scans, the requirement for providing the toner powder boxes which must be replenished by the operator from time to time, and the lack of any mechanism for automatically advancing an image-receiving sheet into operative relation with the drum are characteristics that detract from the practicality of incorporating such a printer into a hand-held electronic image camera.

U.S. Pat. No. 3,780,214 issued to F. Bestenreiner et al on Dec. 18, 1973 is relevant for showing a printing apparatus for making a color print by the selective transfer of colored printing mediums from transfer sheets to an image-receiving sheet in accordance with electronic image signals. The printer comprises three printing stations A, B and C each of which included means for electronically modulating a laser beam in accordance with one of three color component image signals, means for advancing one of three colored transfer sheets past the modulated beam to melt or liquify a color pigment thereon to form a thermal image thereon and means for advancing an image-receiving sheet into contact with the transfer sheet to transfer the thermal image thereto. The image receiving sheet is fed from a long roll and is advanced sequentially to stations A, B and C such that the three colored images are applied thereto in overlying relation to form the color print. The complexity of the image receiving sheet transport mechanism required to assure that each of the thermal images are transferred thereto in proper registration and the space requirements for separate printing stations for each color preclude the use of this type of printer in a hand-held electronic imaging camera.

SUMMARY OF THE INVENTION

The present invention provides a compact printer for use with electronic image recording apparatus for providing a color print of an electronically recorded image of a scene on an image-receiving sheet.

In a preferred embodiment the printer is configured to form part of a hand-held, self-processing, electronic imaging camera of the type disclosed in the previously noted copending application Ser. No. 891,705 which provides a plurality of distinct electronic image signals that collectively represent a color record of an optical image in electronic data form and individually represent different color components of the optical image.

The camera also is configured to hold a supply or stack of image-receiving sheets and a transfer sheet, both of which may be supplied in a single cassette. The transfer sheet preferably includes thereon a number of sequentially arranged sets of adjacent parallel stripes of different colored printing mediums that are each adapted to be selectively transferred to the image-receiving sheet, in accordance with a corresponding one of the plurality of distinct electronic image signals, to form overlying colored dot-like patterns on the image-receiving sheet which define the recorded image in a manner similar in some respects to a color halftone lithographic printing process.

The printer includes a frame; a rotatably mounted drum for supporting and rotating an image-receiving sheet; a mechanism for advancing an image-receiving sheet into operative relation with the drum whereby it is wrapped onto the drum during an initial revolution thereof and for advancing or indexing the transfer sheet to present a fresh set of colored printing medium stripes at a fixed position adjacent the drum for each successive print, a printing head mounted for linear movement along the length of the drum and mounting a plurality of printing transducers thereon which track along the colored stripes at the fixed position and convert the image signals into printing signals in a form of energy, such as pressure or thermal energy which when applied to the stripes is effective to cause the selective transfer of the printing mediums to the image-receiving sheet on the drum, and drive means for rotatably driving the drum and linearly driving the printing head in coordinated relation to the rotation of the drum to effect the printout of the recorded image as the printing head is advanced along the drum.

Advantageously, the plurality of printing transducers are mounted on a single printing head and operate simultaneously so that the different colored printing mediums are transferred to the image-receiving sheet during a single scan.

The printing head is driven by the drive means from a first position to a second position during image printing and thereafter is as adapted to be manually reset back to the first position in preparation for making the next print. In a preferred embodiment the mechanism for advancing the image-receiving sheet and the transfer sheet operates automatically in response to resetting the printing head back to the first position.

As the printing head is moved between its first and second positions it engages and actuates a plurality of electrical switches that initiate such functions as rewinding a magnetic tape in the camera one image frame in preparation to providing image signals to the printer, actuating the drive means and the providing of such signals to the printer and reversing the rotation of the drum following the making of a print to cause the image-receiving sheet to be at least partially unwrapped therefrom to facilitate its removal.

Therefore it is an object of the present invention to provide a compact printer that is suitable for use in a hand-held electronic imaging camera and provides a color print of an electronically-recorded image on an image-receiving sheet.

It is another object of the invention to provide such a printer which includes provisions for advancing an image-receiving sheet into operative relation with a drum forming part of the printer so that the image-receiving sheet is wrapped onto a support surface of the drum during an initial revolution thereof and for advancing a transfer sheet to present the next set of colored printing medium stripes thereon at a fixed position adjacent the support surface in preparation for making a color print.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
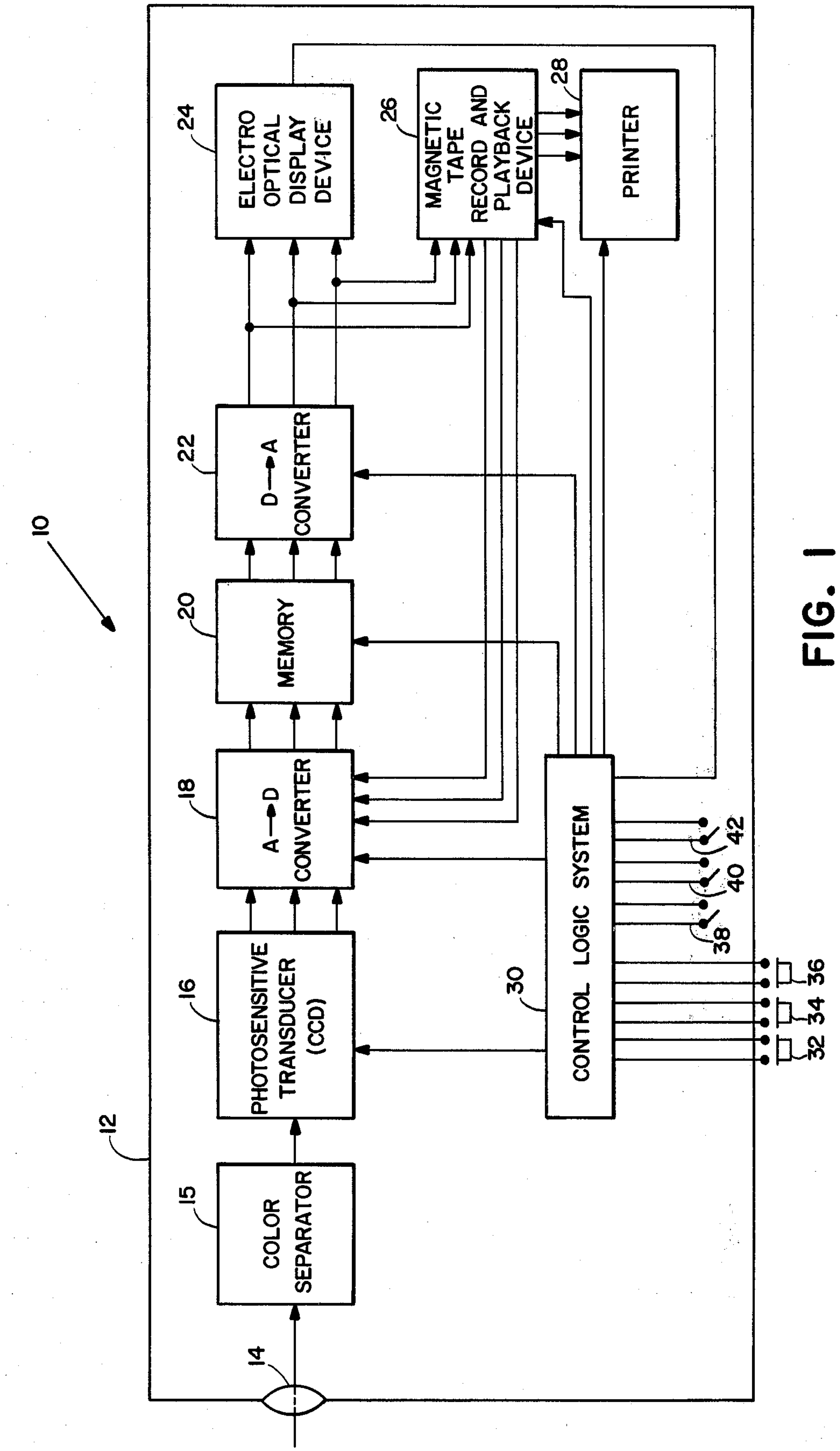
FIG. 1 is a block diagram showing the major components of a hand-held, self-processing electronic imaging camera including a printer embodying the present invention.

The printer embodying the present invention is illustrated as forming part of a hand-held, self-processing, electronic-imaging camera 10 and is numerically designated 28 in the drawings.

Camera 10 will be described briefly herein to provide enough detail to disclose the working environment of printer 28. A complete description of camera 10 may be found in the previously noted copending application Ser. No. 891,705.

FIG. 1 of the drawings shows, in block diagram form, the basic components of the hand-held, self-processing electronic imaging camera 10 for electronically recording an image of a scene, displaying the recorded image on an electro-optical display device so the operator of the camera may audit his results and rendering or printing out a hard copy print of the recorded image on an image-receiving sheet.

The camera 10 includes a housing 12, an optical system including an objective lens or lens assembly 14 for providing an optical image of a scene to be recorded, a color separator 15 for separating the optical image into its red, green, and blue primary color components, a photosensitive transducer 16 for converting the primary color components of the optical image into corresponding analog electronic image signals that represent the optical image in electronic data form, an analog to digital (A→D) converter 18 for converting the analog signals into digital signals, a memory 20 for receiving these signals and storing the same, a D→A converter 22 for converting digital signals from the memory 20 back to analog form, an electro-optical display device 24 responsive to the electronic image signals provided from memory 20 through D→A converter 22 for providing a visual display of the image, a magnetic recording and playback unit 26 for recording electronic image signals provided from memory 20 through converter 22 on a magnetic recording medium such as magnetic tape and providing image signals from the tape when operated in the playback mode; a printer 28 responsive to electronic image signals provided from the magnetic tape for printing out or rendering a print of the image on an image receiving sheet, and a control logic system 30 for controlling, in a coordinated manner, various components of camera 10.

FIG. 1 illustrates a preferred embodiment of camera 10 wherein it is configured to provide a hard copy print of the recorded image in full color.

As will become apparent later, to provide such a color print it is necessary to drive or modulate printer 28 with three separate electronic image signals which respectively represent the red, green and blue primary color components of the optical image in electronic data form. These three separate electronic image signals are generated by separating the optical image provided by lens 14 into its three primary color components with color separator 15 and utilizing photosensitive transducer 16 to convert the three primary color components of the optical image into the three corresponding electronic image signals.

The three primary color image signals are fed into memory 20 and are supplied therefrom to display device 24, on a recirculating basis, so that the operator may audit his results and to the magnetic record and playback device 26 where one cycle or one full frame of image information is recorded on magnetic tape at a video rate for later playback to supply the image signals to printer 28 to make a color print.

To make a hard copy print of the recorded image the record and playback device 26 is operated in the playback mode at a relatively slow rate and the electronic image signals are applied to the printer 28.

The printer 28, to be described in detail later, operates in a substractive color mode and forms the color print by printing out on a receiving sheet overlying secondary color dot patterns to reproduce the light intensities and color content of the original scene. The dot patterns are produced by effecting the selective transfer of secondary color (cyan, magenta and yellow) printing mediums from a transfer sheet to an image-receiving sheet in accordance with three secondary color image signals that are derived from the three primary color image signals.

In a preferred embodiment, the image-receiving material may comprise a plain sheet of high quality printing grade paper that is receptive to color printing mediums such as inks and dyes that are used in commercial printing processes.

The color printing mediums are preferably provided on a transfer sheet (later described with reference to FIGS. 6 and 7) having a repeating series of three adjacent stripes or bars of secondary color inks or dyes (cyan, magenta and yellow) thereon.

The printer 28 is of the scanning type and includes means for electronically converting the three primary color image signals into three corresponding secondary color image signals, a rotatably driven drum on which the receiving sheet is wrapped and a printing head assembly mounted for synchronized axial movement along the drum and including three printing transducers, one for each of the three secondary color image signals, that convert the secondary color image signals into printing signals that are in a form of energy that is effective to transfer the secondary color mediums from the transfer sheet to the image-receiving sheet.

The control logic system 30 includes a plurality of electronic circuits that provide the various timing, gate switching, sequencing, control and synchronization signals and signal amplification required by the photosensitive transducer 16, A→D converter 18, memory 20, D→A converter 22, display device 24, recording and playback device 26 and printer 28.

The control logic system also includes control switches 32, 34, 36, 38, 40 and 42. The switches 32, 34 and 36 are button-type switches which are manually actuable by the operator. Switch 32 is operable to initiate a cycle of operation wherein an optical image is converted into electronic image signals which are fed through memory 20 to display device 24 for image display and simultaneously to record and playback device 26 for recording the signals on magnetic tape. Switch 34 is operable to initiate a cycle of operation wherein the magnetic tape holding a plurality of electronically recorded images thereon is rewound to the beginning of the tape. Switch 36 is operable to initiate a cycle of operation wherein previously recorded image information on the magnetic tape is played back and is fed to memory 20 through A→D converter 18 and then to the display device 24 from memory 20 through D→A converter 22.

The switches 38, 40 and 42 are associated with printer 28 and they are actuated by a later-to-be-described movable printing head assembly forming part of printer 28. Briefly, switch 38 is operable to rewind the magnetic tape in device 26 one picture frame (i.e., one electronically recorded image) in preparation to feed the electronic image signals comprising the picture frame to printer 28. In response to moving the printing head assembly to an operative position wherein it is located to begin a printout cycle, switch 40 is actuated and it initiates a print cycle wherein the recorded and playback device 26 feeds the electronic image signals to a converter in printer 28 which converts them to corresponding secondary color signals which are fed to the printing transducers on the printing head assembly while the printer drum is rotated and the printing head assembly is driven along the drum to effect the selective transfer of the secondary color printing mediums from the transfer sheet to the image-receiving sheet on the drum. At the end of the printout cycle, the printing head assembly has moved to a position wherein it actuates switch 42 which is operable to initiate a cycle of operation wherein the image-receiving sheet is advanced from the printer drum and out through a withdrawal slot in camera housing 12 where it is accessible to the camera operator.

For a detailed description of the electronic circuits associated with control logic system 30 reference may be had to the previously noted copending application Ser. No. 891,705.

Figure 2:
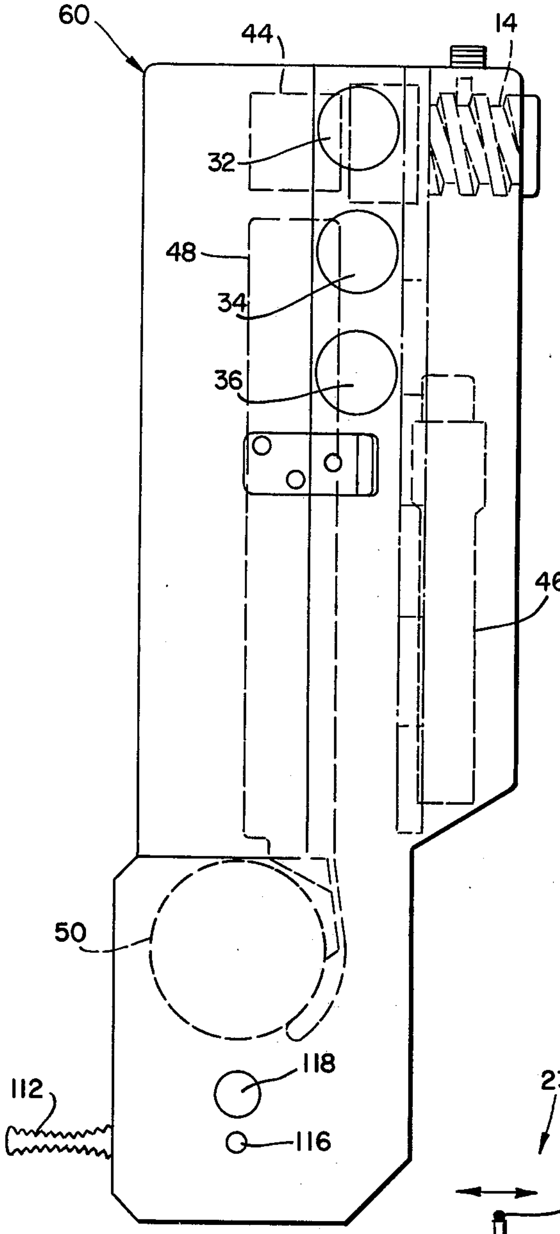
FIG. 2 is a side elevational view of the camera with certain camera components including a drum forming part of the printer shown in dotted lines.

FIG. 2 of the drawings shows a side view of camera 10 showing the arrangement of certain camera components including the lens 14, a module 44 housing the color separator 15 and the photosensitive transducer 16, the button switches 32, 34 and 36, a magnetic tape cassette 46, a later-to-be-described cassette 48 holding a supply of image-receiving sheets and a transfer sheet and a drum 50 forming part of printer 28.

Figure 3:
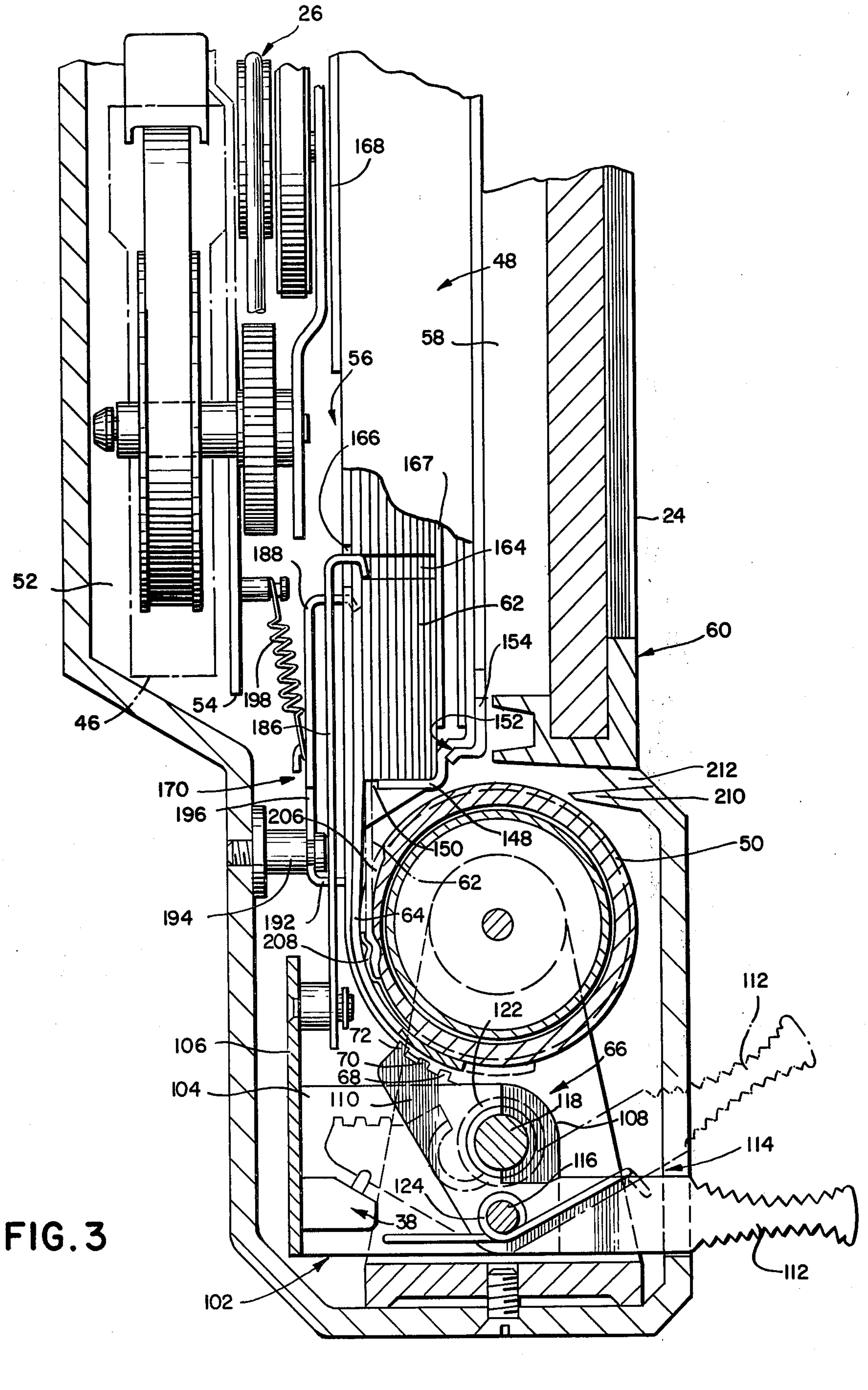
FIG. 3 is an enlarged side sectional view of a portion of the camera showing details of the printer embodying the present invention.

FIG. 3 shows more details of the camera components. In the upper portion of housing 12 the magnetic tape cassette 46 is located in a chamber 52 in operative relation with the magnetic tape record and playback device 26 mounted on support plate 54. The cassette 48 is located in a chamber 56 behind device 26 and a flat battery 58 and the flat panel display device 24 are mounted on a rear pivoting housing section 60 of camera housing 12 that opens to provide access to chamber 56.

Before describing cassette 48, its contents (a stack of image-receiving sheets 62 and a transfer sheet 64) and the structure defining the cassette receiving chamber 56, the printer 28 will be described with reference to FIGS. 3, 4 and 5.

The printer 28 located in the lower section of housing 12, includes the rotatably mounted hollow cylindrical drum 50 for supporting and rotating an image-receiving sheet 62 wrapped on an exterior support surface of drum 50 and a printing head assembly 66 mounted for linear axial movement along the drum surface and mounting thereon three printing transducers 68, 70 and 72 to which three secondary color image signals, derived from the three primary color image signals fed to printer 28, are applied for converting the secondary color image signals into corresponding printing signals in a form of energy, such as pressure or thermal energy, that is effective to cause the selective transfer of secondary color printing mediums from the transfer sheet 64 to an image-receiving sheet 62 on drum 50.

In a preferred embodiment the means for driving drum 50 and the printing head assembly 66 include a small high speed reversible electrical motor 74 and its associated drive train located within the hollow center of drum 50.

Figure 4:
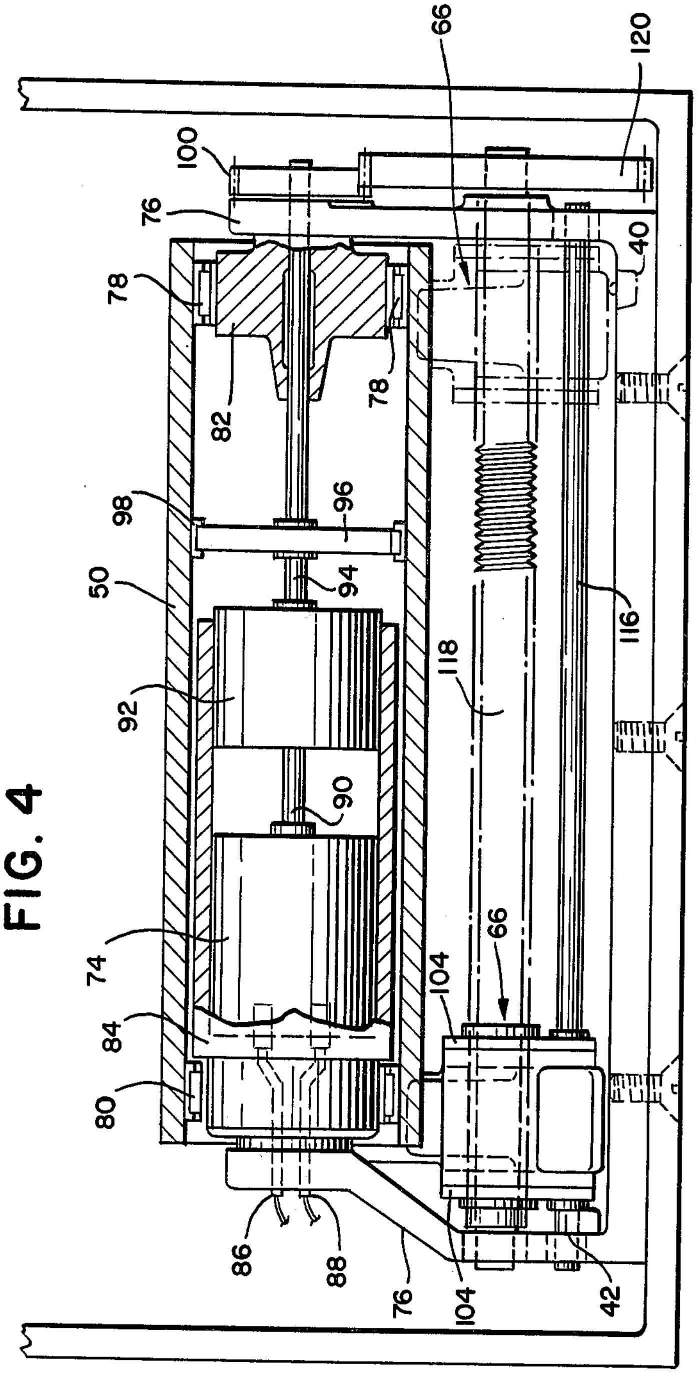
FIG. 4 is an enlarged rear sectional view of the printer showing details of the printer drum and its associated drum and printing head assembly drive system.

As best shown in FIG. 4, a view looking into the lower section of housing 12 from the rear of camera 10, the drum 50, the drive means and the printing head assembly 66 are shown mounted on a generally U-shaped support frame 76 secured to the bottom wall of housing 12.

The hollow drum 50 is supported for rotation about its axis by a pair of internal bearings 78 and 80 mounted on opposed support members 82 and 84 that are fixedly secured to opposite sides of support frame 76 and extend into the hollow center of drum 50.

Motor 74 is fixedly secured to support member 84 and includes a pair of electrical power leads 86 and 88 through which motor 74 is energized. The motor's output shaft 90 is coupled to a speed reducing gear train assembly 92 which is fixedly secured to support member 84 and has an output shaft 94. Fixedly secured to shaft 94 is a drum drive gear 96 which is in mesh with an internal gear 98 secured to the internal cylindrical surface of drum 50. The output shaft 94 of the speed reducer 92 extends beyond gear 96 and through support member 82 and support frame 76 and has a gear 100 fixedly secured to the end thereof which serves as a power take off gear for driving the printing head assembly 66.

As noted earlier, the printing head assembly 66 is mounted for linear axial movement along the drum 50 as drum 50 is rotated such that the printing transducers 68, 70 and 72 scan the entire image-receiving area of an image receiving sheet 62 on drum 50 during the course of a printout cycle of operation.

Figure 5:
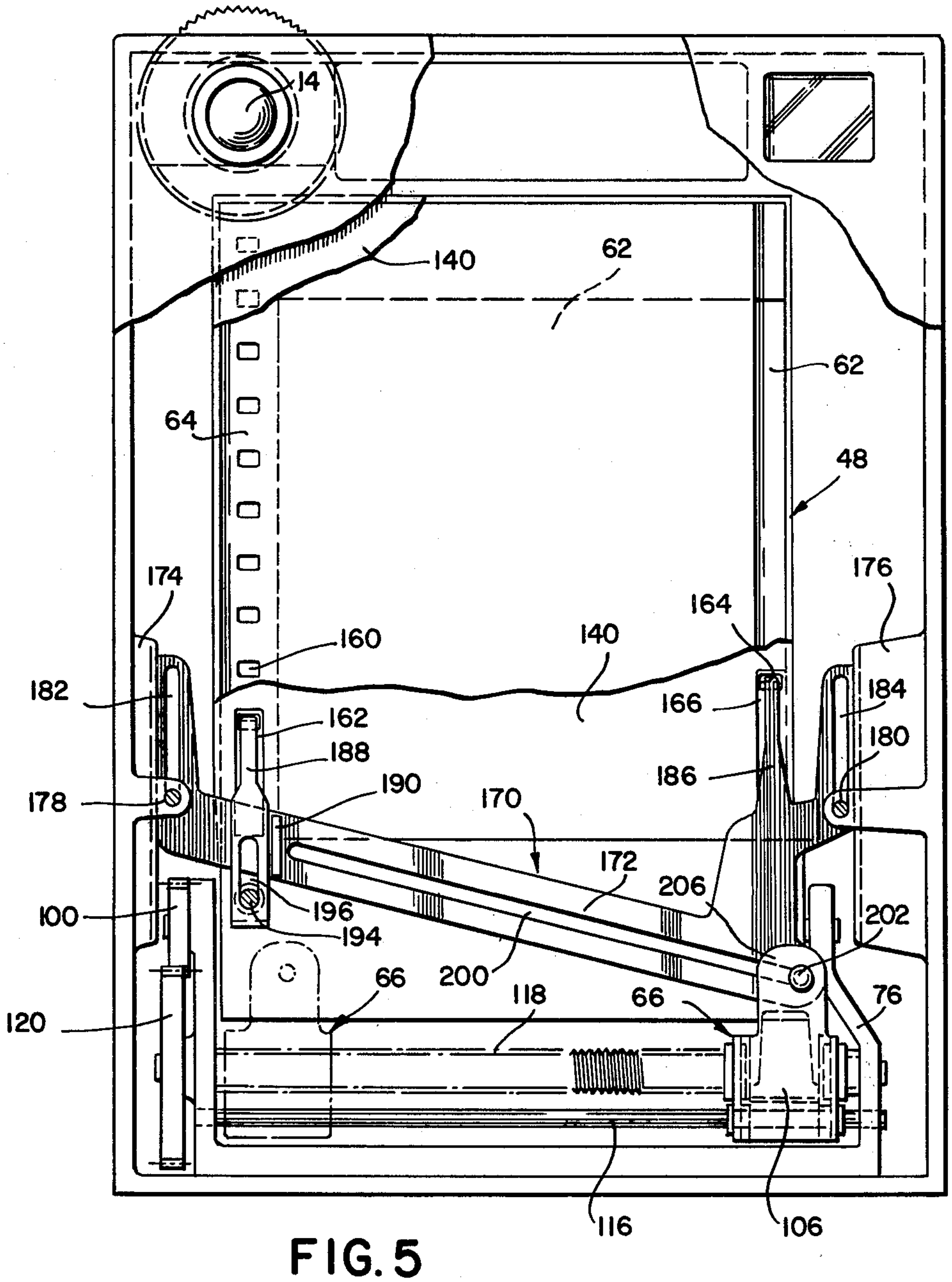
FIG. 5 is a front elevational view of the camera, partially cut away to show the details of an image-receiving sheet and transfer sheet advancing mechanism associated with the printer.

As best shown in FIGS. 3, 4 and 5, the printing head assembly 66 comprises a carriage member 102 defined by a pair of vertically disposed spaced side walls 104 and a connecting rear wall 106 which extends above side walls 104 and a generally L-shaped print head 108 disposed between side walls 104 and including a short leg 110 which mounts printing transducers 68, 70 and 72 and a longer leg 112 which extends out of the lower portion of housing 12 through an elongated slot or opening 114 provided in the rear wall thereof and serves as an actuating lever or handle to facilitate the manual manipulation of assembly 66.

The carriage member 102 and the L-shaped print head 108 are mounted on a horizontal rod or guide pin 116 which extends between the opposed upright arms of support frame 76 below drum 50 for sliding movement between the end of print terminal position (shown in solid lines in FIGS. 4 and 5) adjacent one end of drum 50 and an initiate print terminal position (shown in phantom lines in FIGS. 4 and 5) adjacent the opposite end of drum 50.

As will become apparent later, assembly 66 is configured to be manually moved along pin 116 from the end of print position to the initiate print position and thereafter to be driven from the initiate print position to the end of print position during the printout cycle.

The means for driving assembly 66 includes a finely threaded horizontally disposed lead screw 118 rotatably mounted in the upright portions of support frame 76 over pin 116. As best shown in FIG. 4, the right-hand end of lead screw 118 extends beyond the right-hand upright of frame 76 and has a gear 120 fixedly secured thereto that is in mesh with the power take off gear 100 on the motor driven output shaft 94 of the speed reducer 92.

The lead screw 118 passes through opposed oversized openings in the side walls 104 of carriage 102 and is normally engaged by a half nut portion 122 of print head 108 which is formed with a complementary screw thread on the interior thereof and is adapted to mesh in driving engagement with the thread of lead screw 118.

In FIG. 3 the print head 108 is shown in its normal operating position in solid lines wherein the half nut portion 122 thereof is located in driving mesh with lead screw 108 and in its inoperative position in phantom lines wherein it is disengaged from lead screw 118 to permit manual sliding movement of assembly 66 along the guide pin 116.

To hold the half nut portion 122 of print head 108 in meshed engagement with lead screw 118, the print head 108 is biased by a torsion spring 124 having one end coupled to print head 108 and its opposite end coupled to side wall 104 of carriage 102 such that print head 108 pivots in a clockwise direction (as viewed in FIG. 3) about guide pin 116 causing the threads of half nut portion 122 to press against the threads of lead screw 118. When so located in this operative position, the printing transducers 68, 70, 72 on print head 108 are located in close proximity to the support surface of drum 50 in position to engage a portion of transfer sheet 64 located against an image-receiving sheet 62 on drum 50 and the handle or lever portion 112 of print head 108 is horizontally oriented.

To disengage the print head 108 from lead screw 118, the handle 112 is manually moved upwardly causing the print head 108 to pivot in a counterclockwise manner about pin 116 against the bias of spring 124 thereby pivoting the half nut portion 122 out of engagement with lead screw 118 and spacing the printing transducers 68, 70 and 72 a substantial distance from the support surface of drum 50. When print head 108 is so disengaged, the print head assembly 66 may be manually moved by sliding it along pin 116 with the raised handle 112 of print head 108.

As will be described later, the motion of the print head assembly 66 as it is manually moved from the end of print position to the initiate print position is used to operate a mechanism for advancing an image-receiving sheet 62 from the cassette 48 into operative relation with drum 50 and also incrementally advancing the transfer sheet 62 relative to the printing transducers 68, 70 and 72 on print head 108.

As noted earlier, the color print of the recorded image is formed on the image-receiving sheet 62 by effecting the selective transfer of cyan, magenta, and yellow printing mediums from the transfer sheet 62 to the image-receiving sheet 62 on drum 50.

The means for effecting the selective transfer of the secondary color printing mediums are the three printing transducers 68, 70 and 72, to be described in detail later, which are modulated or driven by three secondary color image signals, derived from the primary color image signals fed to printer 28, and convert the secondary color image signals into printing signals in a form of energy, such as pressure or thermal energy, which when applied to the transfer sheet 64 effects the selective transfer of the secondary color printing mediums therefrom to image-receiving sheet 62 thereby printing three superimposed dot patterns on the image-receiving sheet 62 that define the recorded image in much the same manner as images printed on a receiving sheet by a subtractive color halftone printing process.

Figure 6:
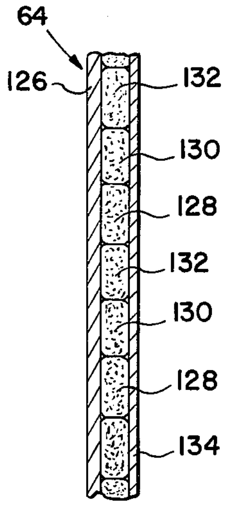
FIG. 6 is a cross-sectional view of a portion of a transfer sheet having colored printing mediums thereon that are adapted to be selectively transferred to an image-receiving sheet to form a color print thereon.
Figure 7:
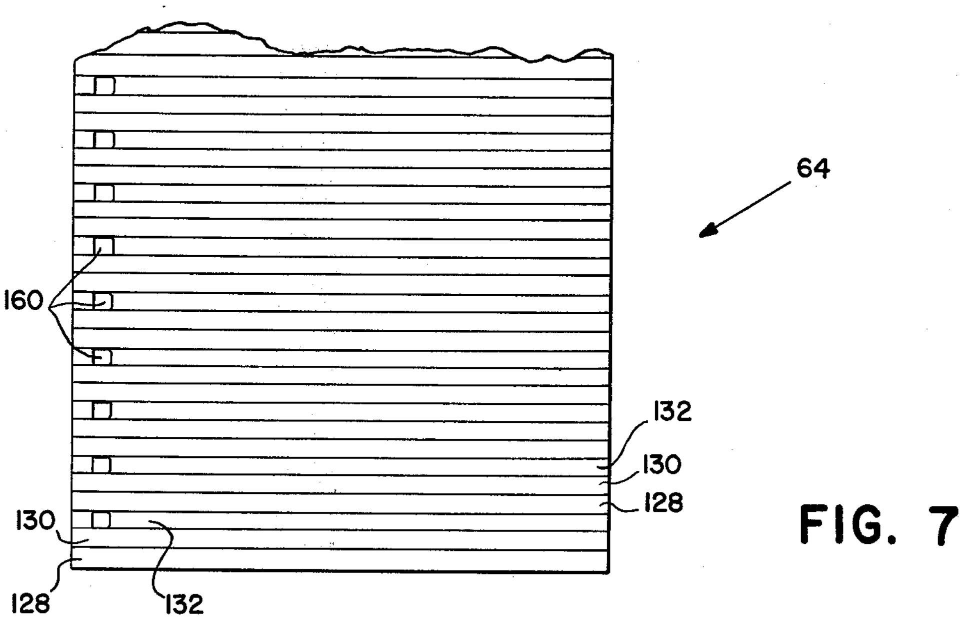
FIG. 7 is a perspective view of the transfer sheet of FIG. 6.

The transfer sheet 64, as best shown in FIGS. 6 and 7, include an elongated base sheet 126 preferably formed of a plastic material such as Mylar having a plurality of secondary color bands or stripes thereon arranged in repeating sets of three sequential bands or stripes 128, 130 and 132 comprising respectively cyan, magenta and yellow inks or dyes releasably adhered to the base sheet 126 by a binding agent such as wax or the like. Overlying the color bands on the opposite side thereof from base sheet 126 is a very thin coating or layer 134 of a polymerized plastic material having a low coefficient of friction.

As will become apparent, the transfer sheet 64 is adapted to be located in operative relation with printer 28 such that one set of the three color bands 128, 130 and 132 is located at a fixed position between an image-receiving sheet 62 on drum 50 and the printing transducers 68, 70 and 72, with the layer 134 facing sheet 62 and the transducers 68, 70 and 72 in engagement with the base sheet 126 in alignment respectively with the bands 128, 130 and 132 which extend along the drum 50 in parallel relation to the axis of drum 50.

When so located, the layer 134 of sheet 64 contacts the image-receiving sheet 62 and the low friction properties of layer 134 allows the sheet 62 to slide thereunder freely in response to rotation of drum 50. Layer 134 also inhibits the transfer of inks in the color bands 128, 130 and 132 until an appropriate printing signals are applied to transfer sheet 64 by the printing transducers 68, 70 and 72.

As noted earlier, the image-receiving sheets 62 comprise a high-quality grade printing paper that is receptive to the cyan, magenta and yellow inks or dyes of transfer sheet 64.

In a preferred embodiment, a stack of image-receiving sheets 62 (for example ten (10)) and a single transfer sheet 62 having at least ten (10) sets of color bands 128, 130 and 132 are provided in the cassette 48 which is adapted to be located in the cassette receiving chamber 56 of camera 10.

Figure 8:
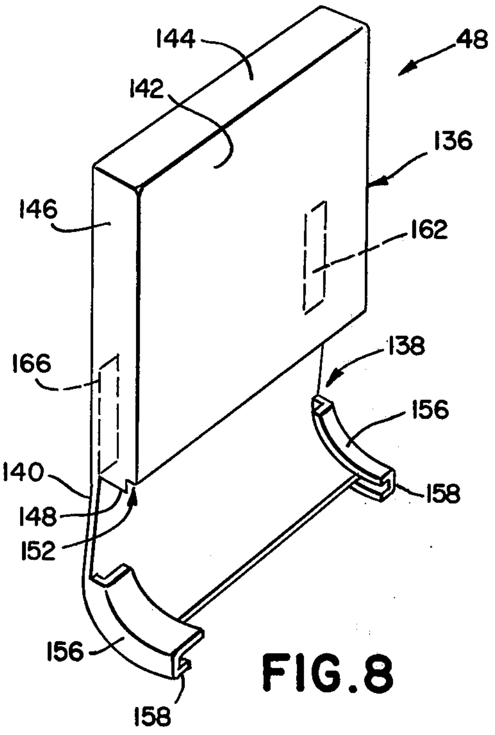
FIG. 8 is a perspective view of a cassette for holding a supply of image-receiving sheets and a transfer sheet.

As best shown in FIGS. 2, 3 and 8, cassette 48 comprises a substantially thin, planar upper box-like section 136 for holding a stack of image-receiving sheets 62 and a portion of transfer sheet 64 and a lower depending curved section 138 which supports a portion of transfer sheet 64 extending out of upper section 136 and serves as a guide for guiding and locating the transfer sheet 64 in operative relation with the printing transducers 68, 70 and 72.

The upper and lower sections 136 and 138 share a common wall 140 which curves at lower section 138 to conform to the shape of drum 50. Upper section 136 is defined by the upper portion of wall 140, an opposed wall 142 and a peripheral section comprising a top wall 144, a pair of side walls 146 and a bottom wall 148 having an elongated withdrawal slot 150 therein adjacent wall 140. It will be noted that cassette 48 includes an indented transition surface 152 at the intersection of walls 142 and 148 which serves as a locating bearing surface that cooperates with an L-shaped flange 154 in receiving chamber 56 to accurately locate cassette 48 therein.

The lower section 138 of cassette 48 includes a pair of integrally formed guide channels 156 along the lateral edges of wall 140 for receiving the lateral edges of transfer sheet 64. It will be noted that the channel structure extends beyond the lower edge of wall 140 as indicated at 158 such that one set of three color bands 68, 70 and 72 on transfer sheet 64 may be located in the extended portions 158 thereby clearing the lower edge of wall 140.

The elongated transfer sheet 64 is initially located against wall 140 of cassette 48 with its base sheet 126 facing wall 140. It extends from the interior of the upper section 136 through withdrawal slot 150 and along the curved portion 138 of wall 140 with its lateral edges in guide channels 156.

As shown in FIG. 7, transfer sheet 64 has a plurality of sprocket holes 160 along one lateral edge thereof which are aligned with an opening 162 in cassette wall 140 which provides access for a later-to-be-described advancing mechanism to engage the holes 160 for the purpose of advancing the transfer sheet 64 relative to cassette 48 and the printing transducers 68, 70 and 72.

The stack of image-receiving sheets 62 is located within the upper section 136 of cassette 48 in overlying relation to the portion of transfer sheet 64 therein with the forwardmost sheet 62 in the stack closest to sheet 64 being in alignment with the withdrawal slot 150.

Each of the sheets 62 has a single sprocket hole 164 in one lateral edge thereof which is aligned with an access opening 166 in wall 140 of cassette 48 that provides access for the later-to-be-described advancing mechanism to an engage hole 164 for the purpose of advancing the forwardmost sheet 62 through withdrawal slot 150 and into operative engagement with drum 50. A spring platen 167 is provided in cassette 48 to urge the stack of image-receiving sheets 53 toward wall 140.

As best shown in FIG. 5, the stack of sheets 62 is offset laterally with respect to transfer sheet 64 such that the lateral edge having the sprocket hole 164 extends beyond the lateral edge of transfer sheet 64 thereby providing clearance for the advancing mechanism to engage sheet 62 through the access opening 166 without engaging transfer sheet 64.

Access for loading cassette 48 into the receiving chamber 56 is provided by pivoting the housing section 60 mounting the display device 24 and the flat battery 58 to its open position.

Before loading cassette 48, the printing head 108 is manually pivoted to its inoperative position to displace the printing transducers 68, 70 and 72 from drum 50. The cassette 48 is inclined with respect to chamber 56 and its lower curved section 138 is inserted first over the top of the drum 50. The cassette is pivoted in a counterclockwise manner (as viewed in FIG. 3) so that the curved portion 138 follows the contour of the drum 50 to locate the extended portions 158 of guide channels 156 in a position wherein the three color bands 128, 130 and 132 of transfer sheet 64 extending therebetween will be aligned with transducers 68, 70 and 72 when print head 108 is returned to its operative position. In response to the pivotal motion of the cassette 48, the upper portion 136 thereof is located at its operative position in chamber 56. As shown in FIG. 3, the upper portion of cassette wall 140 bears against a vertically disposed locating plate 168 in the upper portion of housing 12 and the indented transition section 152 of cassette 48 rests against the conforming locating bracket 154. Once cassette 48 is located in its operative position in chamber 56, the print head 108 is pivoted back to its operative position.

The means for advancing an image-receiving sheet 62 into operative relation with drum 50 and incrementally advancing the transfer sheet 64 to present a fresh set of color bands 128, 130 and 132 at the fixed position in alignment with printing transducers 68, 70 and 72 for each printout includes a pick mechanism 170 which is operable in response to manually moving the printing head assembly 66 from the end of print position shown in solid lines in FIG. 5 to the initiate print position shown in phantom lines.

The pick mechanism 170 includes an elongated slide member 172 having its opposite lateral side portions slidably captured in vertically disposed guide channels 174 and 176 on the interior of side walls of housing 12. The vertical sliding motion of slide member 172 is limited by fixed stop pins 178 and 180 which extend through elongated vertical slots 182 and 184 in member 172 adjacent guide channels 174 and 176.

Integrally formed with slide member 172 is a first pick arm 186 having a hook-like upper end that is adapted to extend through access opening 166 in cassette wall 140 and into the sprocket hole 164 in the forwardmost image-receiving sheet 62 in the stack thereby engaging the forwardmost sheet 62 for advancement through withdrawal slot 150 toward drum 50 in response to downward movement of slide member 172.

A second pick arm 188 is mounted on slide member 172 and includes a hook-like upper end that is adapted to extend through access opening 162 in cassette wall 140 and into one of the sprocket holes 160 in transfer sheet 64 thereby engaging sheet 64 for advancement through withdrawal slot 150 and relative to the printing transducers 68, 70 and 72 to present a new set of the three color bands 128, 130 and 134 in alignment with the transducers in response to downward movement of slide member 172.

The distance that the forwardmost image-receiving sheet 62 must be moved to engage it with drum 50 exceeds the incremental distance transfer sheet 64 must be moved to advance it one set of color bands. Therefore, the pick arm 188 is mounted on slide member 172 in a manner which provides for an appropriate amount of lost motion.

As best shown in FIGS. 3 and 5, pick arm 188 is mounted in a pair of guide channels 190 on member 172 for vertical sliding motion relative thereto. Arm 188 terminates in a horizontal flange 192 at its lower end that extends rearwardly under the lower edge of slide member 172. Flange 192 is spaced a predetermined distance below member 172 by means of a guide pin 194 on a forward lower wall of housing 12, that extends through a vertical slot 196 in arm 188 and a spring 198, having one end attached to arm 188; and its opposite end attached to a lug on plate 54 of device 26, which provides an upward biasing force on arm 188 to hold the lower end of slot 196 against pin 194.

As best shown in FIG. 5, the slide member 172 also has an inclined elongated slot 200 therein for slidably receiving a drive pin 202 fixedly mounted on a pin support extension 206 of wall 106 of printing head carriage 102 that forms part of print head assembly 66. It is readily apparent that as assembly 66 is moved from its end-of-print position to its initiate print position (to the left as viewed in FIG. 5) the horizontal movement of pin 202 riding in slot 200 will drive the slide member 172 downwardly from the position shown in FIG. 3, and that movement of pin 202 in the opposite direction in response to the lead screw 118 driving assembly 66 from the initiate print position to the end-of-print position will cause slide member 172 to be driven upwardly.

Assume now that the pick mechanism 170 is in its fully raised position shown in FIGS. 3 and 5 with the print head assembly 66 located in the end-of-print position (to the right as viewed in FIG. 5). To initiate a printout cycle of operation, the camera operator manually raises the handle portion 112 of print head 108 which causes the print head 108 to pivot thereby disengaging the half nut portion 122 from lead screw 118 and spacing the transducers 68, 70 and 72 from drum 50. As best shown in FIG. 3 when print head 108 is pivoted to its disengaged position, it engages and closes a normally open switch 38 mounted on carriage 102 thereby actuating a circuit which operates the magnetic record and playback device 26 causing it to rewind the magnetic tape one frame.

As the operator manually moves print head assembly 66 to the left as viewed in FIG. 5, the pin 202 in slot 200 drives the slide member 172 and the integral pick arm 186 thereon downwardly and arm 186 advances the forwardmost image-receiving sheet 62 through slot 150 toward drum 50.

During the initial downward movement of slide member 172, the second pick arm 188 remains stationary because it is held in its up position by the biasing force of spring 198. Pick arm 188 remains in this position until the lower edge of slide member 172 engages the horizontal flange 192 at the lower end of arm 188 at which point member 172 begins to drive arm 188 downwardly therewith overcoming the bias of spring 198. As member 172 is further advanced downwardly, pick arm 186 advances sheet 62 towards drum 50 while arm 188 simultaneously advances the transfer sheet 64 relative to the operative position of transducers 68, 70 and 72. As noted earlier, the transfer sheet 64 is adapted to be advanced a shorter distance than the image-receiving sheet 62 and this is accomplished by the lost motion characteristics of pick mechanism 170 which delays initiating movement of pick arm 188 until pick arm 186 has moved through a predetermined distance.

As best shown in FIG. 3, the drum 50 has an elongated slot 206 formed along its length for receiving the leading end of image-receiving sheet 62 (shown in dotted lines) and a spring retaining clip 208 for releasably retaining the leading end in slot 206. As pick mechanism 170 approaches the end of its downward travel, arm 186 advances image-receiving sheet 62 into slot 206 such that its leading end is captured in spring retaining clip 208. At this point, pick arm 188 has advanced the transfer sheet 64 one set of color bands 128, 130 and 132 relative to the operative position of transducers 68, 70 and 72 on print head 108. Although not shown in the drawings, ramp-like cam members are provided in the path of travel of pick arms 186 and 188 such that they are cammed slightly away from cassette 48 at the end of the downward movement of pick mechanism 172 thereby disengaging the hook like ends of arms 186 and 188 from the respective sprocket holes in image-receiving sheet 62 and transfer sheet 64.

As best shown in FIG. 4, the button switch 40 is located on the horizontal portion of support frame 76 near the right-hand end of drum 50. When the print head assembly 66 is located in the initiate print position (the right-hand terminal position as viewed in FIG. 4), the operator begins the actual printout phase by lowering the handle portion 112 of print head 108 which engages and closes the normally open switch 40 when the print head 108 is in its operative position.

The closing of switch 40 energizes and actuates a circuit which operates the tape record and playback device 26 in a playback mode to feed the electronic image signals to printer 28 and actuates another circuit which operates printer 28.

The motor 74 is energized with a voltage having the appropriate polarity such that the drum 50 is rotated in a counterclockwise direction (as viewed in FIG. 3) and the lead screw 118 is rotated in the appropriate direction to cause the print head assembly 66 to be driven from the initiate print position shown in phantom lines to the end-of-print position shown in solid lines in FIGS. 4 and 5.

During the course of the initial revolution of drum 50 the forwardmost image-receiving sheet 62 having its leading end captured in slot 206 by clip 208 is pulled through slot 150 of cassette 48 and is wrapped on the support surface of drum 50. As drum 50 rotates, the print head assembly 66 is driven along lead screw 118 and the printing transducers 68, 70 and 72, in engagement with the color bands 128, 130 and 132 of the transfer sheet 64, are selectively energized by the secondary color image signals to effect the selective transfer of the secondary color print mediums from sheet 64 to sheet 62 to print out the recorded image.

As assembly 66 is driven along lead screw 118, the pick mechanism 170 is driven upwardly by pin 202 riding along slot 200.

When the print head assembly 66 reaches the end of print position, the left side wall 104 of carriage 102 engages and closes the normally open switch 42 mounted on the left-hand upright of frame 76 (as viewed in FIG. 4). The closing of switch 42 actuates a circuit which is effective to brake the rotation of motor 74 thereby stopping the rotation of drum 50 and thereafter apply a reverse polarity voltage to motor 74 causing it to run for a short time in reverse such that drum 50 revolves through a single clockwise revolution. During the course of this single revolution, the trailing or free end of the image-receiving sheet 62 on drum 50 is lifted therefrom by a wedge-shaped stripper bar 200 (see FIG. 3) extending inwardly toward drum 50 from the top edge of a rear wall section of housing section 60 thereby feeding the trailing end of sheet 62 through a print exit slot 212 defined by bar 210 and a bottom wall portion of housing section 60 on the rear side of camera housing 12. In response to this single reverse revolution of drum 50 at least a portion of the image-receiving sheet 62 is advanced to the exterior of camera 10 through exit slot 312 where it may be grasped by the operator and manually pulled to release its leading end from retaining clip 208.

For each successive print, the transfer sheet 64 is advanced to provide a fresh set of the three secondary color bands 128, 130 and 132 in alignment with the printing transducers 68, 70 and 72, and the used portion of sheet 64 accummulates in a receptacle (not shown) in the hollow space between the bottom of drum 50 and the rear wall section of housing 12. A small door (not shown) may be provided in the rear wall section which provides access to the receptacle for removing the transfer sheet 64.

During the course of the printout cycle the magnetic tape record and playback device 26 feeds the primary colors red, green and blue electronic image signals representing the recorded image from the magnetic tape to printer 28. Because the printer 28 is designed to operate in a subtractive color mode using the secondary colors, cyan, magenta and yellow, the primary color image signals must be converted to equivalent secondary color image signals which are then applied to the printing transducers 68, 70 and 72.

For example, printer 28 is operative to reproduce the color red by laying down superimposed magenta and yellow dots. Therefore, a red input signal must be converted to equivalent magenta and yellow signals. Likewise, the color green is rendered by superimposed cyan and yellow dots and blue is rendered by superimposed magenta and cyan dots.

For any given set of the three primary color electronic image signals that represent a particular color in the additive color mode, there is an equivalent set of the secondary color image signals that represent the same color in the subtractive color mode. The relation of the primary signals to the secondary signals may be described mathematically by a set of simultaneous transformation equations that balance the color characteristics of the red, green and blue color filters of color separator 15 with the color characteristics of the cyan, magenta and yellow inks or dyes used in the transfer sheet 64. Once the relationship between the two color systems is defined by the set of simultaneous transformation equations the conversion may be done electronically by means of a matrixing circuit.

Figure 9:
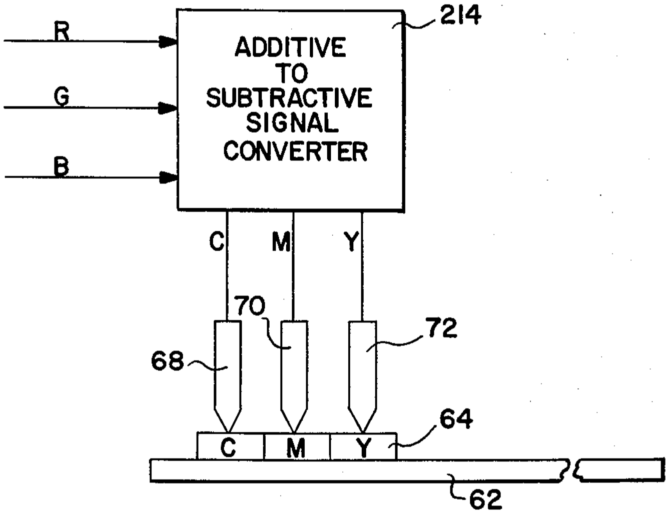
FIG. 9 is a schematic view of a portion of the printer showing three printing transducers in operative relationship with a set of three secondary color bands on the transfer sheet.

As best shown in FIG. 9, the printer 28 includes means for converting the additive primary color red, green, and blue image signals to corresponding subtractive secondary color cyan, magenta and yellow images signals in the form of an electronic matrixing circuit 214 designated ADDITIVE TO SUBTRACTIVE SIGNAL CONVERTER circuit 214. The three primary color electronic image signals from the magnetic record and playback device 26 are fed into circuit 214 which converts these signals into equivalent secondary color image signals that are fed to the printing transducers 68, 70 and 72. Because the printing transducers 68, 70 and 72 are spaced relative to one another on print head 108, it is necessary to adjust the phase relationship of the secondary color image signals such that the three transducers may operate to superimpose three color dots defining a single picture element at one location on the image-receiving sheet. In a preferred embodiment circuit 214 also includes such means for adjusting the phase relationship of the secondary color image signals in accordance with the physical spacing of the printing transducers 68, 70 and 72 and the diameter and operating speed of rotation of drum 50.

During each revolution of the drum 50 the printing transducers 68, 70 and 72 print out a single line of image information in the form of overlying secondary color dots and the screw thread 118 advances the print head assembly 66 in synchronization with the rotation of drum 50 to index the printing transducers 68, 70 and 72 one line position for each revolution of drum 50 so that the entire image-receiving area of sheet 62 is scanned in response to advancing assembly 66 from the initiate print position to the end-of-print position.

As noted earlier the printing transducers 68, 70 and 72 preferably convert an electronic image signal applied thereto to a printing signal in the form of pressure or thermal energy which acts on the transfer sheet 64 and is effective to cause the transfer of the printing mediums from transfer sheet 64 to the image-receiving sheet 62 on drum 50.

Figure 10:
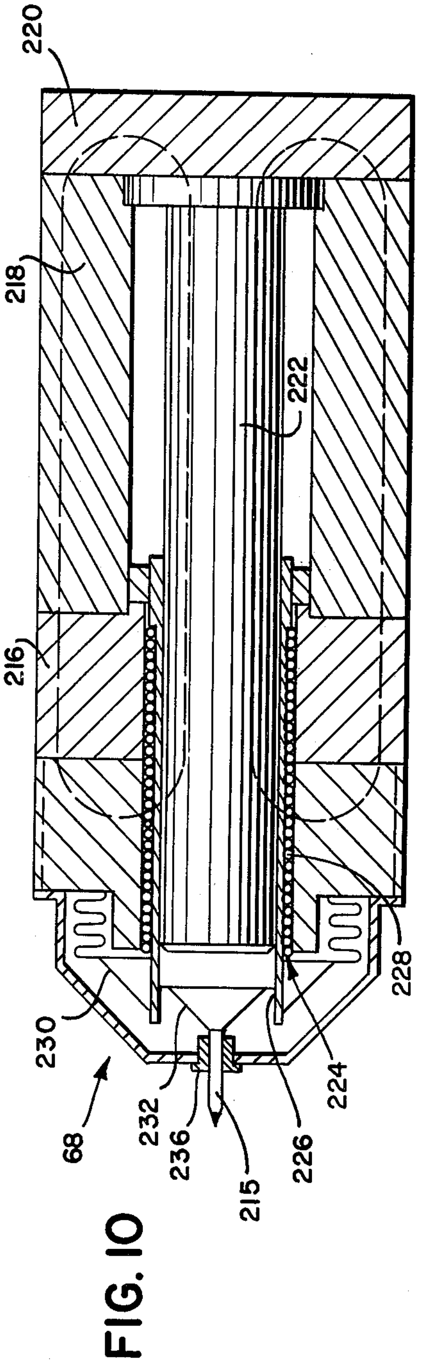
FIG. 10 is a cross-sectional view of a printing transducer for converting electronic image signals into pressure printing signals.

One type of printing transducer which provides a pressure output in response to an electronic signal input is shown in FIG. 10 of the drawings.

The printing transducer designated 68 in FIG. 10 (transducers 70 and 72 being identical to transducer 68) is of the electromagnetic type and includes a diamond-pointed stylus 215 that is adapted to engage the base layer 126 of the transfer sheet 64 and apply pressure therethrough to the ink or dye in the color band causing it to transfer to the image-receiving sheet in much the same manner that ink is transferred from a typewriter ribbon to a receiving sheet upon pressure impact of a print head.

The transducer 68 includes an annular steel collar 216, an annular magnet 218 having one of its pole ends coupled to collar 216, a steel base piece 220 coupled to the opposite pole end of magnet 218, a steel shaft 222 mounted on base piece 220 and extending through magnet 218 and into the open central bore of collar 216 to define an annular gap 224 between shaft 222 and collar 216, and a non-magnetic drive tube 226 having a wire coil 228 wound thereon, slidably mounted for axial movement on shaft 222 in gap 224.

The drive tube 226 extends slightly beyond the end of shaft 222 and it is coupled to the collar 216 by means of a bellow-like spring member 230. Mounted in the open bore of tube 226 is a cone-like diaphragm portion or member 232 of member 230 having the diamond-pointed stylus 215 secured thereto. The stylus 215 extends through the open central bore of a protective transducer end cap 236.

Through magnetic coupling with magnet 218 the collar 216 and shaft 222 are oppositely magnetically polarized thereby establishing a magnetic force field across gap 224. When a secondary color electronic image signal is applied to coil 228, the current flow therethrough interacts with the magnetic field and produces a thrust force, proportional to the signal strength, that is effective to displace the drive tube 226 and the stylus 215 thereon axially in the direction of the end cap 236. When the signal is removed from coil 228 the tube 226 and stylus 215 thereon are restored to the initial position by the bellow-like spring member 230. In this manner, the stylus 215 is driven in an axial direction with a force that is proportional to the strength of the image signal applied to coil 228.

The three printing transducers 68, 70 and 72 are mounted on the short leg 110 of print head 108 such that the diamond point on their respective styluses 215 preferably just engage the base sheet 126 of the cyan, magenta and yellow color bands 128, 130 and 132 on transfer sheet 64 when the print head 108 is located in its operative position (shown in solid lines in FIG. 3) with no real image signal applied to their respective coils 228. Alternatively the points of styluses 215 may be spaced slightly from the base sheet 126 when there is no signal applied.

In either event when an image signal is applied to the coil 218 of any one of the transducers, its stylus 215 is driven axially toward the drum 50 so as to engage the base sheet 126 of the transfer sheet 64 and apply sufficient pressure therethrough to the printing medium which is displaced from the color band and adheres to the image-receiving sheet 62 on drum 50. It will be noted that the plastic layer 134 on transfer sheet 64 is sufficiently thin and ruptures upon the pressure impact provided by stylus 215 so as not to inhibit such displacement of the printing medium and its transfer to sheet 62.

The transfer of the printing medium to sheet 62 creates a color dot thereon which may be slightly elongated because of the rotation of the image-receiving sheet 62 by the drum 50. The size of the dot is proportional to the amount of pressure applied to transfer sheet 64 by stylus 215 which in turn is proportional to the strength of the image signal applied to coil 228. Therefore, the dot size is proportional to signal strength. That is, a relatively strong image signal produces a greater amount of pressure than a weaker signal and the size of the dot increases with increasing pressure.

As noted earlier an image is printed out on the receiving sheet 62 in the form of three overlying secondary color dot patterns which are similar in some respects to those produced in color halftone printing processes. The dots are applied with essentially equal spacing between dots. However, the dot size is varied in proportion to image signal strength to provide variations in density or color saturation. That is, in the high light area of the image the equally spaced dots are relatively small and are viewed against the white background of the image-receiving sheet 62 so as to appear low in color saturation. On the other hand in shadow areas the equally spaced dots are much larger in size and less of the white background is visible and the apparent color saturation is much higher.

In preferred embodiment of camera 10, the imaging system and printer 28 have an operating resolution of approximately 200 lines/inch. The image-receiving area of image-receiving sheet 62 measures approximately 3″×3″ and the total printout time approximates one minute with drum 186 being driven at the rate of 600 RPM. The individual color dots have a maximum diameter of approximately 0.008 of an inch.

As noted earlier, it is within the scope of the present invention to provide a printer 28 with printing transducers which convert the electronic image signals into a form of energy other than pressure, such as thermal energy, to effect the selective transfer of colored printing mediums from transfer sheet 64 to image-receiving sheet 62.

Figure 11:
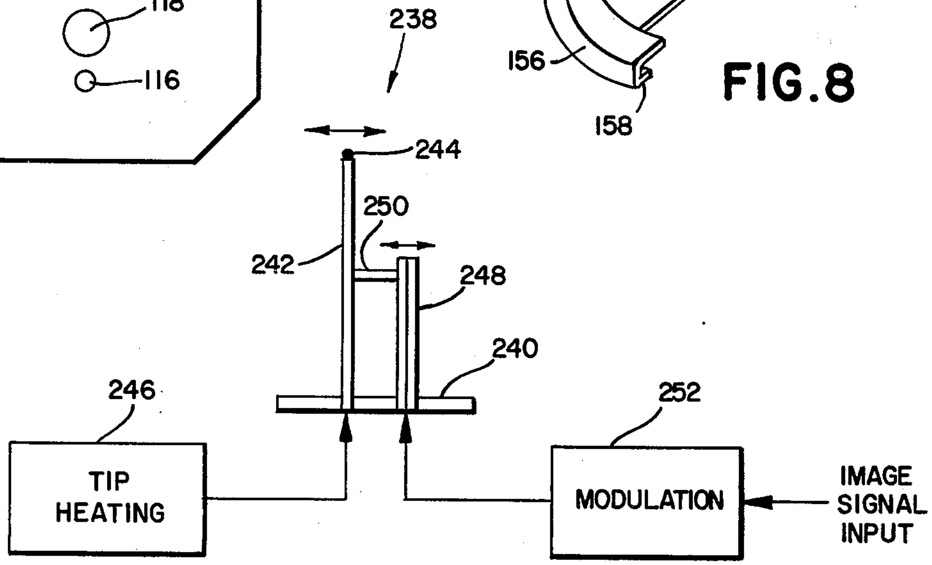
FIG. 11 is a schematic view of a printing transducer for converting electronic image signals into thermal energy printing signals.

An example of a thermal energy transducer suitable for use in printer 28 is shown in FIG. 11 of the drawings.

The transducer, designated 238, comprises a base plate 240 formed of any suitable electrical and thermal insulating material; a slender resilient stylus 242 mounted on plate 240 having a pointed tip 244 made of an electrically resistive material so as to become heated when a heating voltage is applied to tip 244 by a TIP HEATING circuit 246 coupled thereto; and a piezo-electric crystal element 248 having an end secured to base plate 240 and its opposite free end mechanically coupled to stylus 242 by a connector 250.

Crystal element 248 is electrically coupled to a MODULATION circuit 252 which drives crystal 248 in accordance with electronic image signals applied to circuit 252, so that the free end of element 248 vibrates or is deflected in directions transverse to its length as shown by the arrows, and element 248 in turn vibrates stylus 242 through connector 250. MODULATION circuit 252 is a constant frequency oscillator and the amplitude of its output signal is proportional to the strength of the electronic image signal input. That is, a strong image signal input causes circuit 252 to provide a high amplitude output which in turn induces a high amplitude vibration in crystal 248 and therefore stylus 242. For a weaker image signal input the resultant amplitude modulation of stylus 242 is proportionally smaller.

In operation the tip 244 of stylus 242 is in engagement with the base 126 of transfer sheet 64 in alignment with one of the color bands 128, 130 or 132 and is continuously heated by TIP HEATING circuit 246 to a temperature whereby the printing medium binder melts thereby liberating the printing medium for transfer to image-receiving sheet 62.

With no image signal input to MODULATION circuit 252 there is no transverse modulation of stylus 242 and therefore heated tip 244 causes a very fine, almost imperceptable line to be drawn on image-receiving sheet 62 in response to rotation of drum 50 and the linear movement of transducer 238 along the drum.

As image signals are applied to MODULATION circuit 252 stylus 244 is transversely vibrated in proportion to signal strength thereby modulating the width of the line traced on image-receiving sheet 62.

Rather than applying individual colored dots to sheet 62 like the previously-described pressure transducer, the modulated thermal transducer 238 simulates the dots by providing a wide line segment in response to the application of a relatively strong image signal and a correspondingly narrower line segment in response to a weaker image signal. It will be apparent to those skilled in the art that other means, such as an electromagnetic coil assembly, may be used in place of piezo-electric crystal 248 to modulate stylus 242 and provide the same type of results. Also transducer 238 may be configured such that tip 244 is automatically disengaged from the transfer sheet when there is no image signal applied thereby eliminating the very fine line described earlier.

Printing signals in the form of thermal energy also may be generated by providing printing transducers which convert the electronic image signals into modulated light beams that are focused on the appropriate colored stripes of the transfer sheet and interact with the colored printing mediums and the binding agent to produce sufficient thermal energy to ėffect selective transfer of the printing mediums to the image-receiving sheet. Such transducers may include laser diodes or light-emitting diodes equipped with light-focusing optics.

While the illustrated camera 10 and printer 28 are configured to provide a color print from the three primary color image signals, it is within the scope of the present invention to modify camera 10 and printer 28 so as to utilize four colors, i.e., red, green, blue and black. Also it will be obvious that a less complex version of camera 10 and printer 28 based on the inventive concepts described herein may be configured to provide a black and white print.

Since certain other changes also may be made in the above-described printer without departing from the scope of the invention herein involved, it is intended that all matter contained in the above description or shown in the accompanying drawings shall be interpreted as illustrative and not in a limiting sense.

What is claimed is:

1. A printer for use with electronic image recording apparatus for providing a color print of an electronically recorded image of a scene on an image receiving sheet, the apparatus being of the type including means for providing a plurality of distinct electronic image signals that collectively represent a color record of an optical image of the scene in electronic data form and individually represent different color components of the optical image, the apparatus also including means for holding a plurality of image receiving sheets and a transfer sheet including thereon a number of sequentially arranged sets of a plurality of adjacent parallel stripes of different colored printing mediums for selective transfer to an image receiving sheet, in accordance with a corresponding electronic image signal, to provide a color print of the recorded image thereon, said printer comprising:

a frame;

a cylindrical drum having an axis and being mounted on said frame for rotation about the axis, said drum also including a support surface on which an image receiving sheet is adapted to be located for support and rotation with said drum and means for releasably receiving and securing one end of an image receiving sheet to said drum such that the image receiving sheet is wrapped onto said support surface in response to an initial revolution of said drum;

means being operative for advancing an image receiving sheet relative to the apparatus holding means such that one end thereof is brought into operative engagement with said receiving and securing means on said drum and for advancing the transfer sheet relative to the apparatus holding means to present a set of stripes of the different colored printing mediums at a fixed position adjacent said support surface of said drum with the stripes extending along the length of said drum in parallel relation to the axis and in proximate facing relation to an image receiving sheet wrapped on said support surface in response to an initial revolution of said drum;

a printing head including a plurality of printing transducers mounted thereon, each of said printing transducers being adapted to have a different one of the plurality of distinct electronic image signals applied thereto for converting the signal into a printing signal in a form of energy which when applied to a corresponding one of the different colored printing medium stripes is effective to cause the selective transfer of the colored printing medium from the one stripe to the image receiving sheet on said drum support surface;

means for mounting said printing head on said frame for linear movement along the length of said drum in a direction parallel to the drum axis between first and second positions such that each of said printing transducers is located in operative alignment with a corresponding one of the plurality of colored printing medium stripes located at said fixed position so as to track along the corresponding stripe as said printing head is advanced from said first position to said second position; and drive means for rotatably driving said drum and simultaneously linearly driving said printing head from said first position to said second position in coordinated relation with the rotation of said drum while the plurality of distinct electronic image signals are applied simultaneously to corresponding ones of said plurality of printing transducers to effect the selective transfer of the different colored mediums to the image receiving sheet, wrapped onto said support surface during the initial revolution of said drum, to provide a color print of the recorded image on the image receiving sheet.

2. A printer as defined in claim 1 wherein said printing head is movable from said second position back to said first position following the making of a color print to reset said printing head at said first position in preparation for making the next color print and said means for advancing an image receiving sheet and the transfer sheet is operated automatically in response to movement of said print head from said second to said first position for advancing an image receiving sheet relative to the apparatus holding means to bring one end of the image receiving sheet into operative engagement with the receiving and securing means of said drum and for advancing the transfer sheet to displace the previously used set of colored printing medium stripes from said fixed position and present the next set of stripes on the transfer sheet thereat.

3. A printer as defined in claim 2 wherein said printing head is configured to be driven from said first position to said second position by said drive means to effect the selective transfer of the colored printing medium from the stripes to the image receiving sheet on said support surface of said drum and thereafter to be manually moved from said second position back to said first position to reset said printing head, said printing head being mounted for movement relative to said drive means between an operative position wherein it is engaged with said drive means so as to be driven thereby and an inoperative position wherein said printing head is disengaged from said drive means to facilitate the manual movement of said printing head from said second position to said first position.

4. A printer as defined in claim 3 wherein said plurality of printing transducers are spaced at a predetermined distance from said support surface of said drum to accommodate a set of colored printing medium stripes at said fixed position therebetween when said printing head is located at said operative position and movement of said printing head from said operative to said inoperative position causes said plurality of printing transducers to be moved further away from said support surface thereby spacing said plurality of printing transducers at a distance from said support surface greater than said predetermined distance to facilitate the advancement of the transfer sheet to present the next unused set of colored printing medium stripes at said fixed position.

5. A printer as defined in claim 3 wherein the apparatus means for providing the plurality of electronic image signals includes a magnetic tape playback device which is responsive to a first control signal to rewind the tape one frame of image information and thereafter is responsive to a second control signal to play back the one frame to provide the image signals to said printer and said drive means includes a reversible electrical motor responsive to a first control signal for driving said drum in one direction during the printing of an image and thereafter is adapted to be reversibly driven in response to a second control signal to drive said drum in a direction opposite said one direction to facilitate the removal of the image receiving sheet therefrom and said printer includes a first electrical switch being actuable to provide said first control signal to the magnetic playback device in response to said printing head being at said second position and being moved from its operative to inoperative position, a second electrical switch being actuable to provide said second control signal to said magnetic tape playback device and said first control signal to said electrical motor in response to said printing head being located at said first position and being moved from its inoperative to its operative position and a third electrical switch being actuable to provide said second control signal to said electrical motor in response to said printing head being located at said second position following its advancement thereto from said first position by said drive means.

6. A printer as defined in claim 1 wherein the end of an image receiving sheet opposite its one end is not secured to said support surface of said drum and said drive means is operative to rotate said drum in one direction to effect the printing of an image on the image receiving sheet and thereafter is operative to rotate said drum in a reverse direction opposite said one direction and said printer further includes means for engaging the opposite end of the image-receiving sheet so that the image receiving sheet is at least partially unwrapped from said support surface, opposite end first, in response to said reverse rotation of said drum to facilitate removal of the image-receiving sheet therefrom.

7. A printer as defined in claim 1 wherein said plurality of printing transducers convert the electronic image signals into printing signals in the form of pressure.

8. A printer as defined in claim 1 wherein said plurality of printing transducers convert the electronic image signals into printing signals in the form of thermal energy.

9. A printer as defined in claim 8 wherein each of said plurality of of printing transducers includes a stylus having a heated tip thereon which is adapted to contact a corresponding stripe on the transfer sheet and apply sufficient thermal energy thereto to effect the transfer of the colored printing medium to the image-receiving sheet and means for modulating said stylus in accordance with a corresponding one of the electronic image signals such that said heated tip vibrates with an amplitude that is proportional to electronic image signal strength and the colored printing medium is transferred to the image-receiving sheet to define line segments thereon which vary in width in proportion to electronic image signal strength.

10. A printer as defined in claim 9 wherein said means for modulating said stylus includes a piezo-electric crystal element.

11. A printer for use in an electronic imaging camera for providing a color print of an electronically recorded image of a scene on an image receiving sheet, the camera being of the type including means for providing three primary color electronic image signals that collectively represent a color record of an optical image of the scene and individually represent the three primary color components of the optical image, the camera also including means for replaceably receiving a cassette holding a plurality of image receiving sheets and a transfer sheet including thereon a plurality of sequentially arranged sets of three adjacent parallel stripes of three different secondary color printing mediums for selective transfer to an image receiving sheet in accordance with a corresponding one of three secondary color electronic image signals, derived from the three primary color electronic image signals, to provide a color print of the recorded image thereon, said printer comprising:

a frame;

a cylindrical drum having an axis and being mounted on said frame for rotation about the axis, said drum also including a support surface on which an image receiving sheet is adapted to be located for support and rotation with said drum and means for releasably receiving and securing one end of an image receiving sheet, advanced from the cassette into operative engagement therewith, to said drum such that the image-receiving sheet is wrapped onto said support surface in response to an initial revolution of said drum;

means being operative for advancing an image receiving sheet relative to the cassette such that one end thereof is brought into operative engagement with said receiving and securing means on said drum and for advancing the transfer sheet relative to the cassette to present a set of three stripes of the secondary color mediums at a fixed position adjacent said support surface of said drum with the stripes extending along the length of said drum in parallel relation to the axis and in proximate facing relation to an image receiving sheet wrapped on said support surface in response to an initial revolution of said drum;

electronic circuit means for converting the three primary color electronic image signals into three corresponding secondary color image signals;

a printing head including three printing transducers mounted thereon, each of said printing transducers being adapted to have a different one of the three secondary color electronic image signals applied thereto for converting the signal into a printing signal in a form of energy which when applied to a corresponding one of the three stripes is effective to cause the selective transfer of the secondary color printing mediums from the one stripe to the image receiving sheet on said drum support surface;

means for mounting said printing head on said frame for linear movement along the length of said drum in a direction parallel to the drum axis between first and second positions such that each of said three printing transducers is located in operative alignment with a corresponding one of the three secondary color printing medium stripes located at said fixed position so as to track along the one corresponding stripe as said printing head is advanced from said first position to said second position; and drive means for rotatably driving said drum and simultaneously linearly driving said printing head from said first position to said second position in coordinated relation with the rotation of said drum while the three secondary color electronic image signals are applied simultaneously to said three printing transducers to effect the selective transfer of the secondary color printing mediums to the image receiving sheet, wrapped onto said support surface during the initial revolution of said drum, to provide a color print of the recorded image on the image receiving sheet.

* * * * *